US009701409B2

(12) United States Patent
Valdes et al.

(10) Patent No.: US 9,701,409 B2
(45) Date of Patent: Jul. 11, 2017

(54) INTEGRATED KEYBOARD TRAY

(71) Applicant: Zodiac Seats US LLC, Gainesville, TX (US)

(72) Inventors: Armando Valdes, Krum, TX (US); Raul Reyes, El Paso, TX (US); Garrett Wolfe, Lewisville, TX (US)

(73) Assignee: Zodiac Seats US LLC, Gainesville, TX (US)

(*) Notice: Subject to any disclaimer, the term of this patent is extended or adjusted under 35 U.S.C. 154(b) by 61 days.

(21) Appl. No.: 14/442,328

(22) PCT Filed: Nov. 12, 2013

(86) PCT No.: PCT/US2013/069583
§ 371 (c)(1),
(2) Date: May 12, 2015

(87) PCT Pub. No.: WO2014/075040
PCT Pub. Date: May 15, 2014

(65) Prior Publication Data
US 2016/0274674 A1    Sep. 22, 2016

Related U.S. Application Data

(60) Provisional application No. 61/725,171, filed on Nov. 12, 2012, provisional application No. 61/725,175, filed on Nov. 12, 2012.

(51) Int. Cl.
*A47B 37/00* (2006.01)
*B64D 11/00* (2006.01)
(Continued)

(52) U.S. Cl.
CPC ........ *B64D 11/00152* (2014.12); *B60N 3/004* (2013.01); *B60R 11/02* (2013.01);
(Continued)

(58) Field of Classification Search
CPC ................ B60N 3/004; B64D 11/0638; A47B 2021/0076
(Continued)

(56) References Cited

U.S. PATENT DOCUMENTS 2,226,854 A    12/1940  Gohn
5,984,347 A    11/1999  Blanc-Rosset
(Continued)

FOREIGN PATENT DOCUMENTS

FR    2898315        9/2007
WO    2002054169    7/2002
(Continued)

OTHER PUBLICATIONS

International Patent Application No. PCT/US2013/069583, International Preliminary Report on Patentability dated May 21, 2015.
(Continued)

*Primary Examiner* — Jose V Chen
(74) *Attorney, Agent, or Firm* — Kilpatrick Townsend & Stockton LLP; Dean W. Russell; Tyler T. McAllister

(57) ABSTRACT

Described herein are integrated keyboard tray assemblies including a tray table comprising a top surface of substantially planar construction and a body, wherein the top surface may be disposed above the body when the tray table is in an open position. The integrated keyboard tray assemblies also including a passenger seat, wherein a rear portion of the passenger seat may share a pivotal connection with at least the body of the food tray, and a sensor adjacent the tray table and configured to detect a user interaction at the top surface of the tray table when the tray table is in the open position.

20 Claims, 10 Drawing Sheets

(51) Int. Cl.
*B64D 11/06* (2006.01)
*G06F 1/16* (2006.01)
*B60N 3/00* (2006.01)
*B60R 11/02* (2006.01)
*G06F 3/02* (2006.01)
*G06F 3/044* (2006.01)
*G06F 3/0488* (2013.01)

(52) U.S. Cl.
CPC .......... *B64D 11/0015* (2013.01); *B64D 11/06* (2013.01); *B64D 11/0638* (2014.12); *G06F 1/1662* (2013.01); *G06F 1/1673* (2013.01); *G06F 3/0219* (2013.01); *G06F 3/044* (2013.01); *G06F 3/04886* (2013.01); *B60R 11/0211* (2013.01); *B60R 11/0229* (2013.01); *B60R 11/0241* (2013.01); *B60R 11/0252* (2013.01); *B60R 2011/0294* (2013.01)

(58) Field of Classification Search
USPC ................ 108/44, 45, 50.01, 50.02; 297/163
See application file for complete search history.

(56) References Cited

U.S. PATENT DOCUMENTS

| | | | |
|---|---|---|---|
| 6,216,927 B1 | 4/2001 | Meritt | |
| 6,758,518 B2* | 7/2004 | Ingram | B60N 3/004 108/44 |
| 7,500,716 B2* | 3/2009 | Guerin | B60N 3/004 297/146 |
| 7,611,198 B2* | 11/2009 | Schweizer | B60N 2/4876 297/146 |
| 7,621,593 B2* | 11/2009 | Dickinson | B60N 3/004 297/146 |
| 7,665,642 B2 | 2/2010 | Abbate | |
| 8,477,482 B2* | 7/2013 | Lin | G06F 1/169 361/679.01 |
| 8,547,057 B2* | 10/2013 | Dunworth | G06Q 30/0267 320/108 |
| 8,561,863 B2 | 10/2013 | LaColla | |
| 8,783,766 B2 | 7/2014 | Westerink | |
| 8,826,830 B2* | 9/2014 | Pajic | A47C 7/70 108/44 |
| 9,004,590 B2 | 4/2015 | Westerink | |
| 9,421,919 B2 | 8/2016 | Westerink | |
| 2001/0011664 A1 | 8/2001 | Meritt | |
| 2004/0150300 A1* | 8/2004 | Wyatt | A47B 21/00 312/223.3 |
| 2005/0178297 A1* | 8/2005 | Pipkin | A47B 23/00 108/25 |
| 2006/0022003 A1 | 2/2006 | Zheng | |
| 2006/0075934 A1 | 4/2006 | Ram | |
| 2007/0222248 A1 | 9/2007 | Maulden | |
| 2008/0072803 A1* | 3/2008 | Korber | A47B 21/00 108/50.01 |
| 2008/0128460 A1 | 6/2008 | Adler | |
| 2010/0096960 A1* | 4/2010 | Lee | A47B 21/00 312/194 |
| 2011/0174926 A1* | 7/2011 | Margis | B60N 2/4876 244/118.6 |
| 2011/0278885 A1 | 11/2011 | Procter et al. | |
| 2012/0024920 A1 | 2/2012 | Grolle | |
| 2012/0125959 A1 | 5/2012 | Kucera | |
| 2012/0139303 A1* | 6/2012 | Westerink | B64D 11/0015 297/163 |
| 2012/0212012 A1* | 8/2012 | Berger | B64D 11/0015 297/163 |
| 2013/0193174 A1 | 8/2013 | Ackeret | |
| 2014/0150233 A1* | 6/2014 | Hussain | F16M 11/22 29/428 |
| 2015/0370292 A1* | 12/2015 | Holm Jensen | A47B 23/04 361/679.2 |
| 2016/0152169 A1* | 6/2016 | Zheng | B64D 11/0636 297/163 |
| 2016/0176356 A1* | 6/2016 | Krikorian | B60R 11/02 224/275 |
| 2016/0250362 A1* | 9/2016 | Mackin | B64D 11/06 |
| 2016/0260019 A1* | 9/2016 | Riquelme Ruiz | A47B 21/007 |

FOREIGN PATENT DOCUMENTS

| | | |
|---|---|---|
| WO | 2008125847 | 10/2008 |
| WO | 2011085023 | 7/2011 |
| WO | 2014075044 A1 | 5/2014 |

OTHER PUBLICATIONS

International Patent Application No. PCT/US2013/069583, International Search Report and Written Opinion dated Feb. 19, 2014.
International Patent Application No. PCT/US2013/069611, International Preliminary Report on Patentability dated May 21, 2015.
International Patent Application No. PCT/US2013/069611, International Search Report and Written Opinion dated Feb. 24, 2014.
U.S. Appl. No. 14/442,316, Non-Final Office Action dated Apr. 19, 2017.

* cited by examiner

INTEGRATED KEYBOARD TRAY

CROSS REFERENCE TO RELATED APPLICATIONS

This application is the U.S. national phase entry of International Application Serial No. PCT/US2013/069583 ("the '583 application"), filed on Nov. 12, 2013, which application is related to and claims priority benefits from U.S. Provisional Application Ser. No. 61/725,175filed on Nov. 12, 2012, entitled "KEYBOARD INTEGRATION TRAY" ("the '175 application") and U.S. Provisional Application Ser. No. 61/725,171 filed on Nov. 12, 2012, entitled "TABLET PC AND KEYBOARD INTEGRATION CONCEPT" ("the '171 application"), the entire contents of which (i.e., the '583 application, '175 application, and the '171 application) are incorporated herein by reference.

This application is related to international Application Serial No. PCT/US2013/069611, filed on the same day herewith, entitled "PERSONAL ELECTRONIC DEVICE MOUNTING ASSEMBLIES," the entire contents of which is hereby incorporated by reference as if fully set forth herein.

FIELD OF THE INVENTION

The disclosure relates to tray tables for passenger seats including integrated electronic input devices.

BACKGROUND

In many instances, passenger vehicles, such as aircraft, buses, trains, ships, and automobiles, include passenger seats equipped with adjustable tray tables. The tray tables may have a relatively smooth top surface and provide a convenient location for users to hold food items while eating during transportation on the passenger vehicles. In some cases, the tray tables may also be used by passengers for other functional purposes, such as to support personal electronic devices (e.g., laptops, tablets, etc.), books, papers, pillows. etc.

The passenger vehicles may also be equipped with a wide assortment of entertainment options to encourage passengers to remain seated as much as possible during transport for safety, crew mobility, and to enable efficient cabin service. Some passenger seats may provide video and audio entertainment, including television, video games, internet access, and other on-board entertainment ("OBE") or in-flight entertainment ("IFE") components. Typically, these entertainment devices are mounted in the seat backs (i.e., above the tray tables) and/or in arm rests (i.e., next to the tray tables) of the passenger seats.

With the advent of personal electronic devices ("PEDs"), such as tablet computers, cell phones, smart phones, hand-held video game systems, personal digital assistants, palm-top computers, DVD players, data or audio-video media players, monitors, e-reader devices, multi-media enabled devices, and other similar electronic devices, passengers have many options for multi-tasking and entertainment during transportation. These options may be available in addition to the OBE or IFE components that are mounted in the passenger seats. Oftentimes, however, it may prove difficult for passengers to effectively use their PEDs or to interact with the OBE or IFE components because of the limited space in most passenger seat configurations.

In some cases, it may be desirable to provide a way for passengers to more conveniently and efficiently interact with their own PEDs and the OBE or IFE components without compromising the functionality of the food trays.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the disclosure provide integrated keyboard tray assemblies for use with passenger seats. While the integrated keyboard tray assemblies are discussed for use with aircraft seats, they are by no means so limited. Rather, embodiments of the integrated keyboard tray assemblies may be used in passenger seats or other seats of any type or otherwise as desired.

Embodiments of the disclosure may include an integrated keyboard tray assembly including a food tray comprising a top surface of substantially planar construction and a body, wherein the top surface may be disposed above the body when the food tray is in an open position. The integrated keyboard tray assembly may also include a passenger seat, wherein a rear portion of the passenger seat may share a pivotal connection with at least the body of the food tray. The integrated keyboard tray assembly may also include a sensor adjacent the food tray and configured to detect a user interaction at the top surface of the food tray when the food tray is in the open position.

According to certain embodiments, the sensor of the integrated keyboard tray assembly may include an optical sensor and the user interaction at the top surface of the food tray may include at least one of discrete input or continuous input.

According to certain embodiments, the integrated keyboard tray assembly may further include a module, the model may include a light source and the sensor, the light source may be configured to emit invisible light, wherein detecting the user interaction at the top surface may include processing a portion of the invisible light sensed by the sensor.

According to other embodiments, a table assembly may include a tray table comprising a body and a planar surface, wherein the planar surface may be disposed adjacent the body. The table assembly may also include a module coupled to the body of the tray table, wherein the module may be arranged to detect input at the planar surface.

According to certain embodiments, the input of the tray table assembly may include input of a user interacting with the planar surface and the module may be configured to process the input of the user and transmit the processed input to an electronic device associated with the table assembly.

According to other embodiments, a passenger seat assembly may include a passenger seat including a seat back and an integrated keyboard tray assembly, which may further include a tray table adjustable from at least a stowed position to at least an open position, wherein a top surface of the tray table may be nearer the seat back of the passenger seat when in the stowed position. The integrated keyboard tray assembly of the passenger seat assembly may also include a module pivotally coupled to the tray table and may be configured to at least detect interaction at the top surface of the tray table, wherein the top surface may include a representative keyboard and at least part of the interaction is with the representative keyboard and detectable by the module.

DETAILED DESCRIPTION

Figure 1:
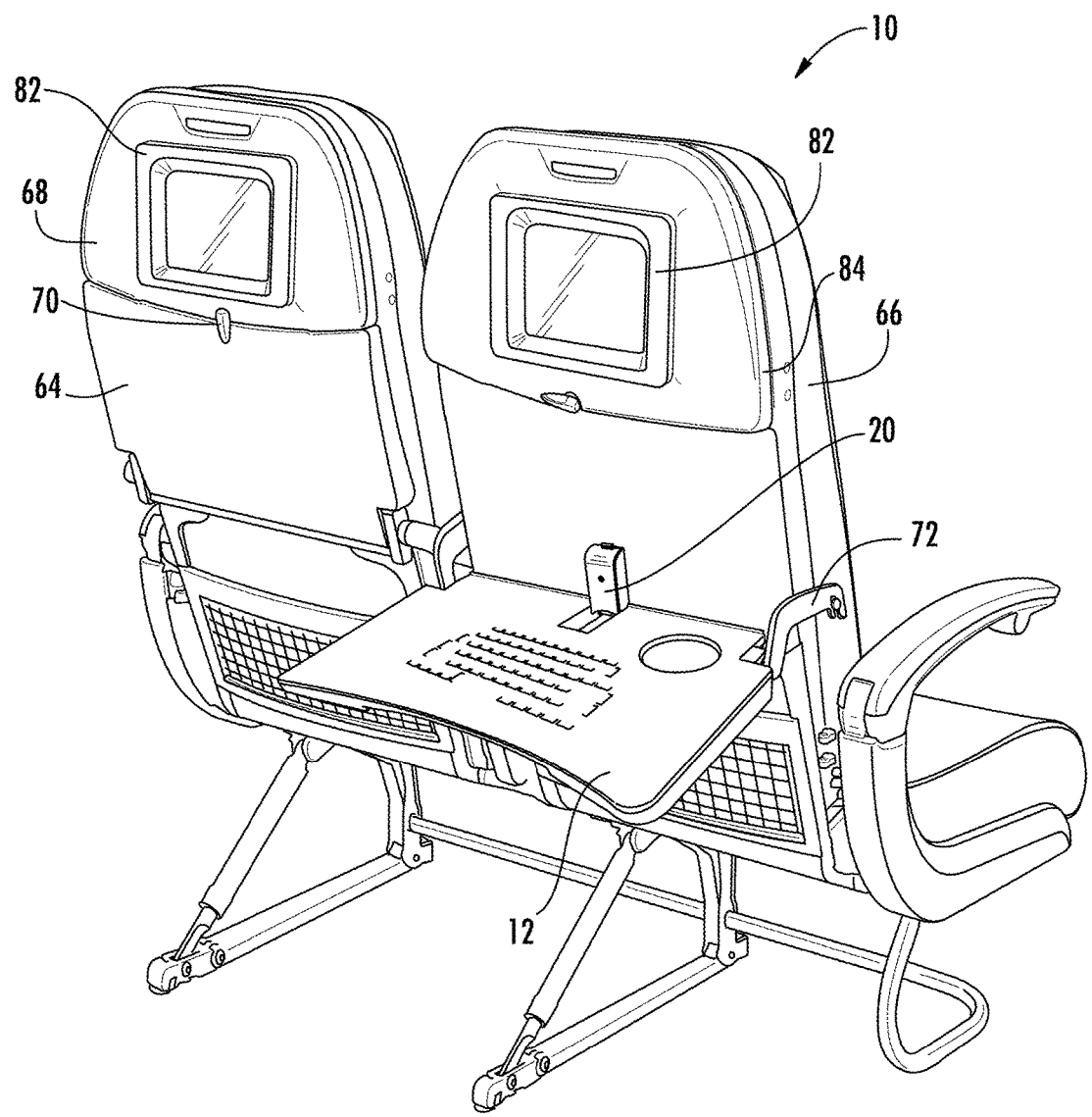
FIG. 1 is a perspective view of an integrated keyboard tray assembly including a pair of passenger seats and an integrated keyboard tray in open position, according to certain embodiments of the present invention.
Figure 2:
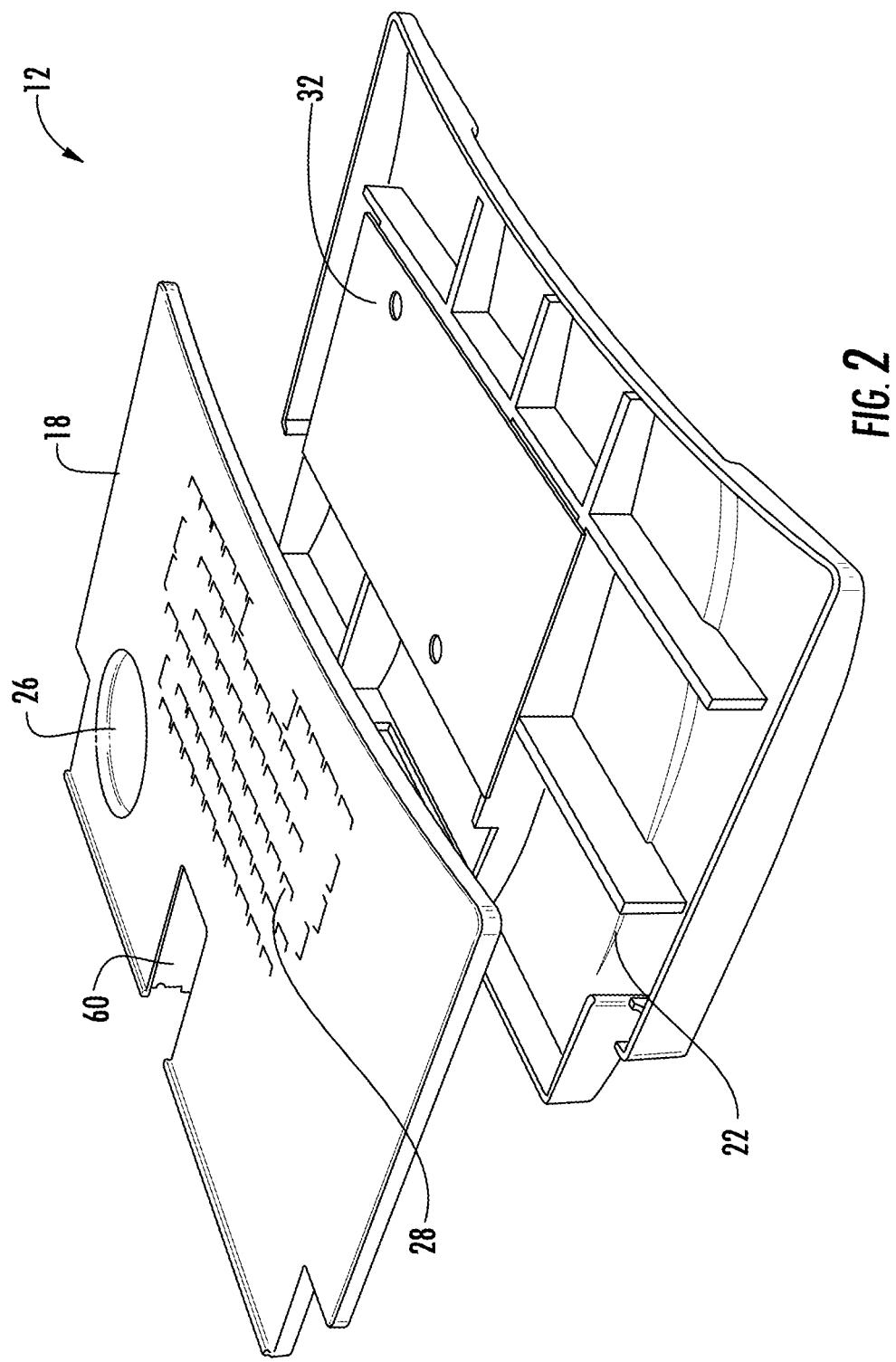
FIG. 2 is a partial exploded view of the integrated keyboard tray of FIG. 1, according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-9 illustrate embodiments of an integrated keyboard assembly 10. In these embodiments, the integrated keyboard assembly 10 includes an integrated keyboard tray 12 and a passenger seat assembly 14. The integrated keyboard tray 12 may be formed of materials including but not limited to plastics, metals, carbon fibers, composite materials, or other suitable materials. In certain embodiments, the integrated keyboard tray 12 may be formed from materials, or be coating with materials, making at least a portion of the integrated keyboard tray 12 easy to clean, semi-rigid, and impact resistant.

The integrated keyboard tray 12 includes a body 16, a planar surface or top surface 18, and a module 20. The body 16 may be formed of materials including but not limited to plastics, metals, carbon fibers, composite materials, or other suitable materials. The body 16 may be secured to the top surface 18 using any suitable mechanism or technique. For example, the body 16 and the top surface 18 may be secured using a snap-lock fit, pressure fit, seam joining, and the like. In at least one embodiment, the body 16 may include a cavity 22. The cavity 22 may generally include a more or less hollow area disposed between the top surface 18 and the body 16. In some examples, the cavity 22 of the body 16 may be configured to receive features implemented in the integrated keyboard tray 12. Such features may include, for example, one or more modules for detecting interaction of a user at the top surface 18, photo-luminescent lighting material, capacitive touch screen products and modules, and the like.

Figure 3A:
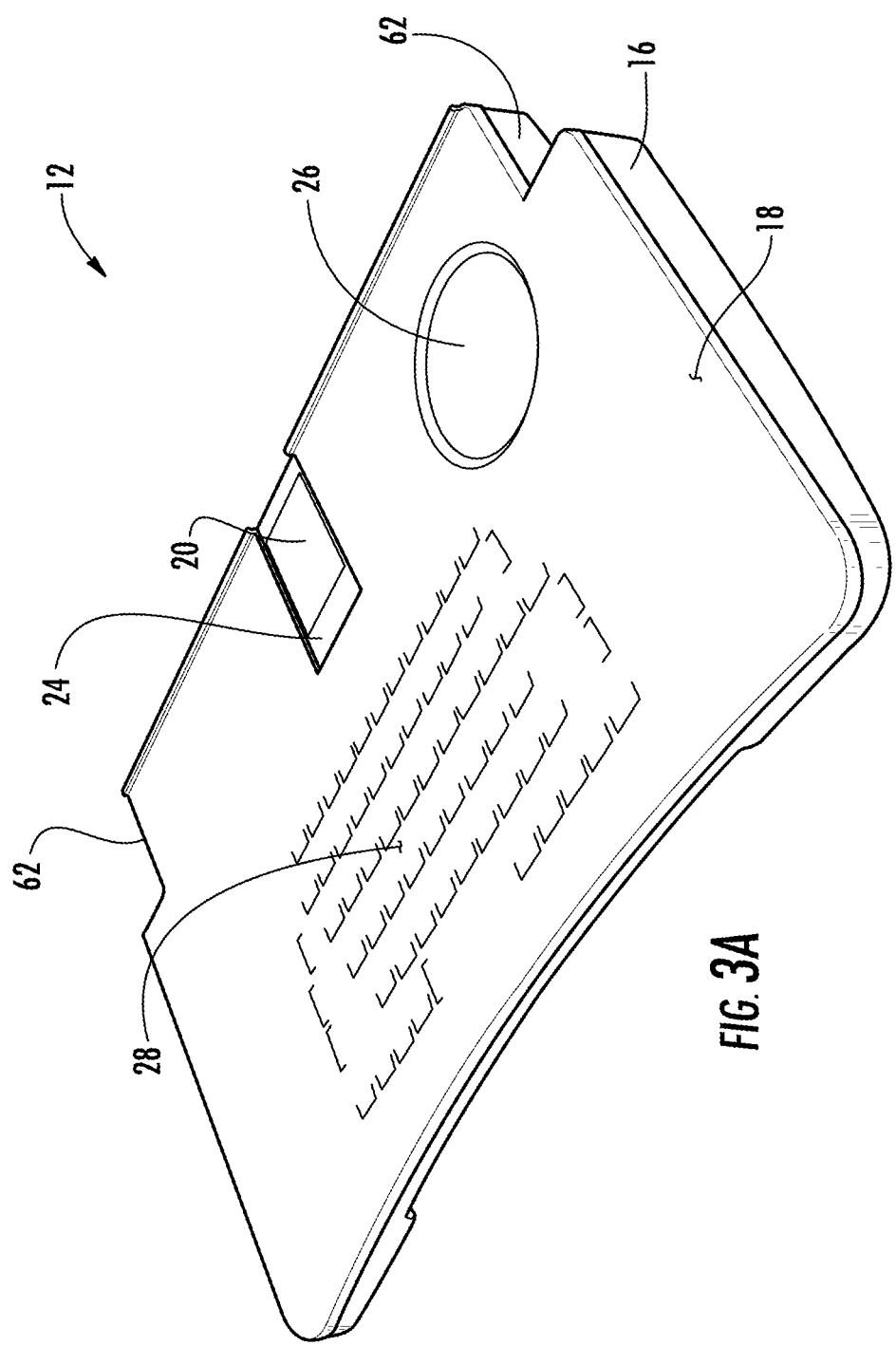
FIG. 3A is a perspective view of the integrated keyboard tray of FIG. 1 with a module in a retracted position, according to certain embodiments of the present invention.
Figure 3B:
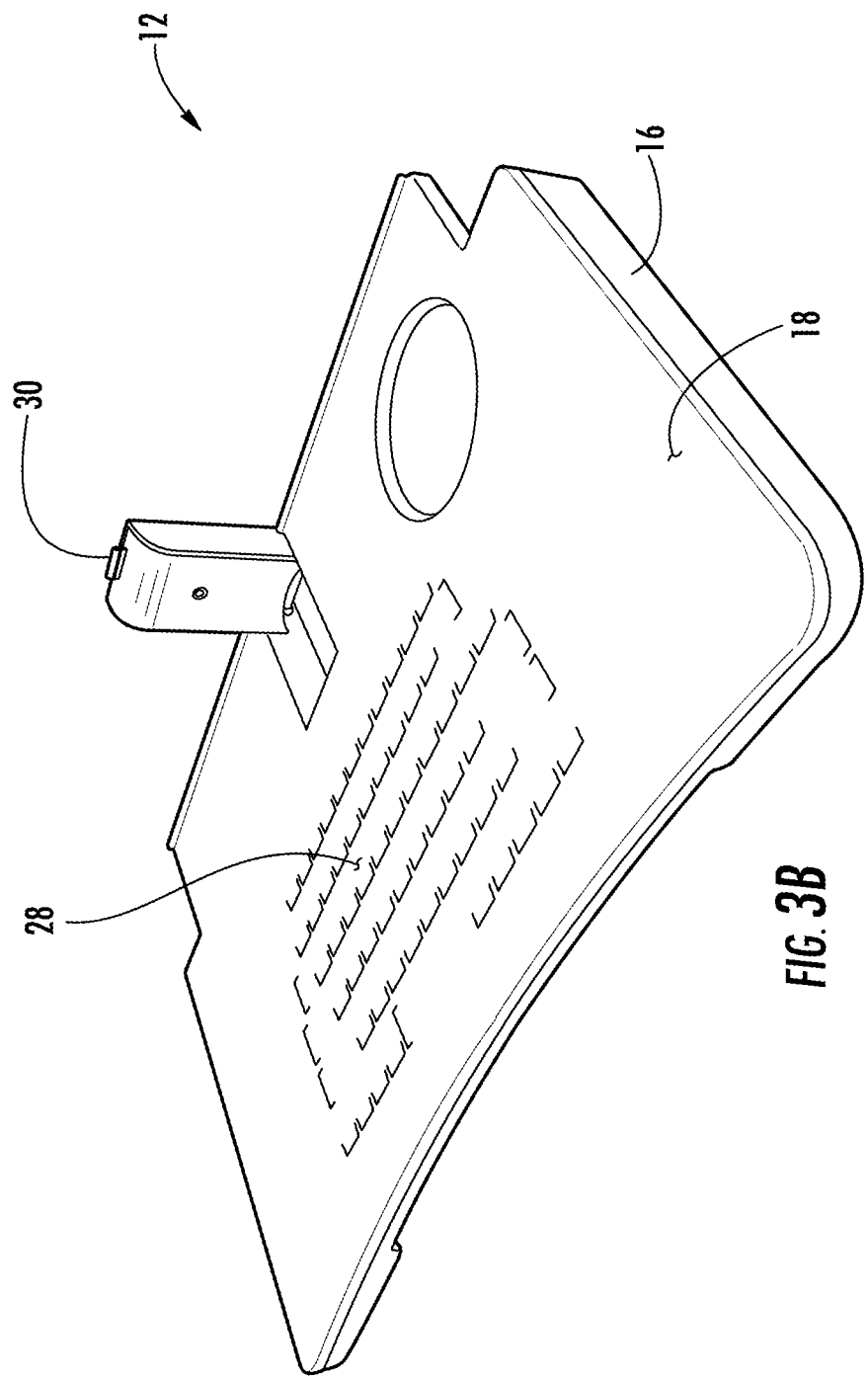
FIG. 3B is a perspective view of the integrated keyboard tray of FIG. 1 with the module in an extended position, according to certain embodiments of the present invention.

As illustrated in FIGS. 3A-3B, the module 20 may be pivotally coupled to the body 16 of the integrated keyboard tray 12. The module 20 may include a locking mechanism 24. In accordance with at least one embodiment, the module 20 may be stowed in a retracted position (or inactive) as illustrated in FIG. 3A and the locking mechanism 24 may be utilized to engage with the integrated keyboard tray 12 to securely hold the module 20 in the retracted position. The locking mechanism 24 of the module 20 may include a locking tab 30. The locking tab 30 may engage with a correspondingly-sized slot or depression (not shown) of the body 16 or the top surface 18 of the integrated keyboard tray 12. When in the retracted position, the module 20, including the locking mechanism 24, may lie in a plane below the top surface 18 or at least be coplanar with the top surface 18. In other words, in accordance with at least one embodiment, when in the retracted position neither the module 20, nor any of its components may extend above the top surface 18. Such an arrangement may be desirable such that top surface 18 remains a smooth and continuous surface suitable for receiving food trays, beverage containers, books, and the like.

The module 20 may be configured to be rotatable (or pivotal) to an extended position (or active) as illustrated in FIG. 3B. When in the extended position, the module 20 may be utilized to implement the techniques described herein related to detecting user interaction at the top surface 18. In accordance with at least one embodiment, the module 20 may be active (i.e., capable of detecting interaction) when not in the extended position. In some examples, when in the extended position, the module 20 may more or less form a right angle with the top surface 18 of the integrated keyboard tray 12. According to at least one embodiment, this alignment between the module 20 and the top surface 18 may be desirable in order to detect user interaction with the top surface 18 according to the techniques described herein. In other examples, the angle between the module 20 and the top surface 18 may be more or less than ninety degrees. As will be discussed in more detail below, in accordance with other embodiments, the module 20 may be arranged in a position that does not contact the integrated keyboard tray 12 or arranged in a position below the top surface 18 (e.g., in the cavity 22). While the module 20 is illustrated as having a relatively rectangular shape with a rounded front surface, it is understood that different sizes and shapes of the module 20 may be presented without departing from the spirit and scope of the invention. For example, if more or less components of the module 20 are included, the size and shape of the module 20 will fluctuate.

In accordance with at least one embodiment, the integrated keyboard tray 12 may also include a cup holder 26. The cup holder 26 may be sized to accommodate any typical beverage container. In some examples, the integrated keyboard tray 12 may also include a graphical representation of a keyboard, such as a representative keyboard 28. The representative keyboard 28 may be generally smooth so as to not affect the functionality of the integrated keyboard tray 12 as a food tray. In some examples, portions of the representative keyboard 28 may be slightly raised to help a user or a passenger identify keys of the representative keyboard 28. The representative keyboard 28 may include unique aesthetic and graphical layouts and configurations of keys and symbols that make the representative keyboard 28. Because space on the top surface 18 may, in some cases, be limited, such layouts and configurations may be unique to the representative keyboard 28. Generally, the representative keyboard 28 may be any suitable keyboard configuration including but not limited to, QWERTY layouts, Non-QWERTY layouts, keyboard layouts for non-latin alphabetic scripts, layouts for Asian languages, and the like. In some examples, the representative keyboard 28 may include a track pad, input surface, and the like. In accordance with at least one embodiment, the representative keyboard 28 may not include any representations of keys. The top surface 18, independent of the type of the representative keyboard 12, may include a plane having at least two dimensions (i.e., X and Y).

In accordance with at least one embodiment, the representative keyboard 28 may include a flat printed stencil-type keyboard. The representative keyboard 28 may be printed and/or etched on the top surface 18 of the integrated keyboard tray 12 using techniques known to one having ordinary skill in the art. The stencil configuration of the representative keyboard 28 may be desirable because of its simplicity, minimal power requirements, minimal wiring requirements, and its use of fewer parts. In some examples, the representative keyboard 28 may include glowing keys. Such glowing keys may be achieved, in accordance with at least one embodiment, by placing photo-luminescent material 32 (e.g., in strips, sheets, or the like) below the top surface 18 (e.g., within the cavity 22), forming the top surface 18 from a translucent plastic, such as Kydex® or the like, and coating the top surface 18 with a dark paint to enhance the contrast between the representative keyboard 28 and the top surface 18. According to this example, outlines of the keys and symbols of the representative keyboard 28 may shine through the translucent plastic and be visible to the passenger in low-light conditions, and in some examples, even be visible in high-light intensity conditions. The glowing keys configuration may be desirable at least because of its illumination in different environments, its non-disruptive glow, the flexibility of surface material and color tone, and the like.

In accordance with at least one embodiment, the representative keyboard 28 may be formed and/or molded as part of the top surface 18. In some examples, the representative keyboard 28 may formed or molded as a separate piece from the top surface 18. When the representative keyboard 28 is formed and/or molded it may be configured as a slight relief relative to the top surface and/or as a slight emboss relative to the top surface 18. In such examples, the representative keyboard 28 may have slightly raised keys, slightly depressed keys, and/or any suitable combination of raised and depressed keys.

Figure 4:
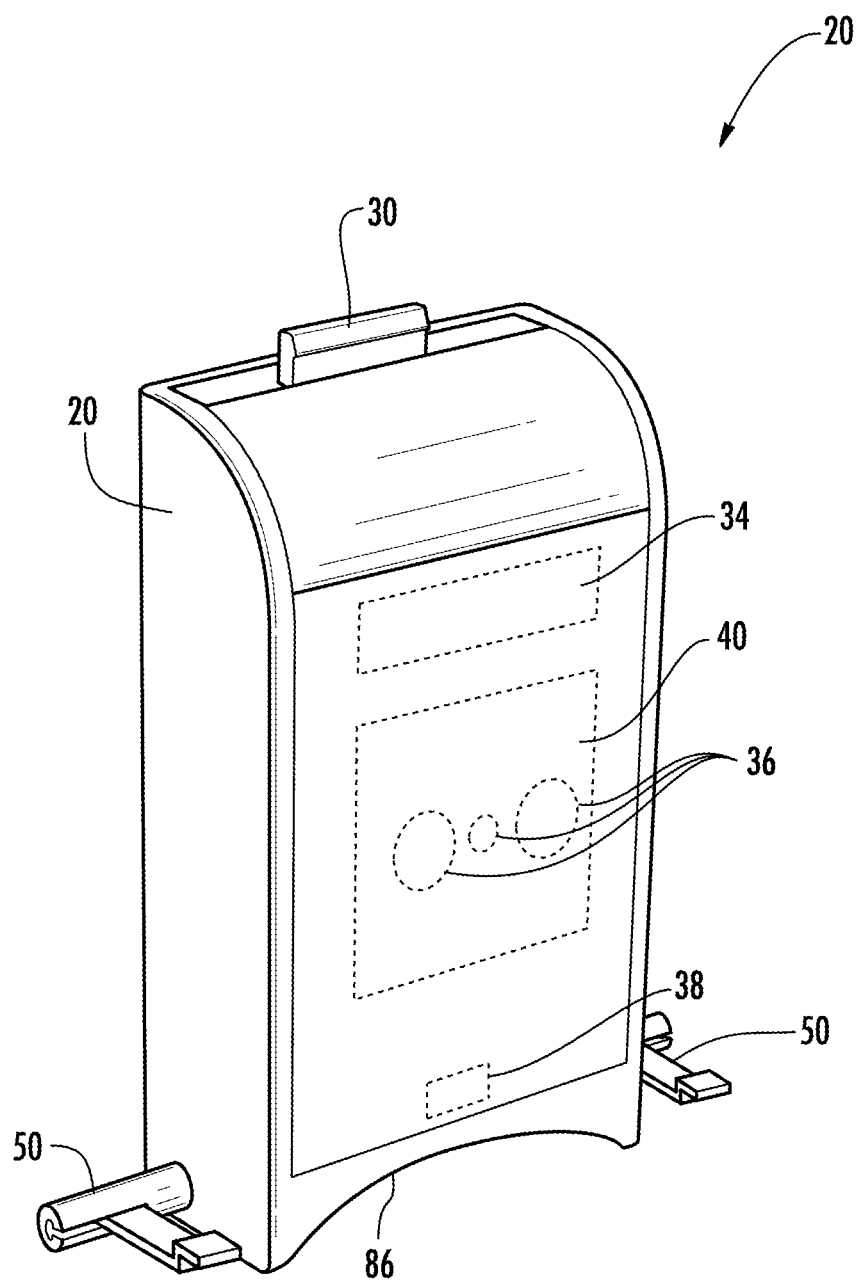
FIG. 4 is a perspective view of the module of FIGS. 3A and 3B, according to certain embodiments of the present invention.

In accordance with at least one embodiment, the representative keyboard 28 may include a laser-projected display. The laser-projected display may be achieved by a laser projector 34 of the module 20. The laser projector 34, as illustrated in FIG. 4, may be located in an upper portion of the module 20. The laser projector 34 may be configured to project a pattern or representation of a keyboard onto the top surface 18. In this manner, the laser-projected display of the representative keyboard 28 may be achieved. In accordance with at least one embodiment, the laser projector 34 may be included in a different part of the integrated keyboard assembly 10 other than the module 20.

Figure 5:
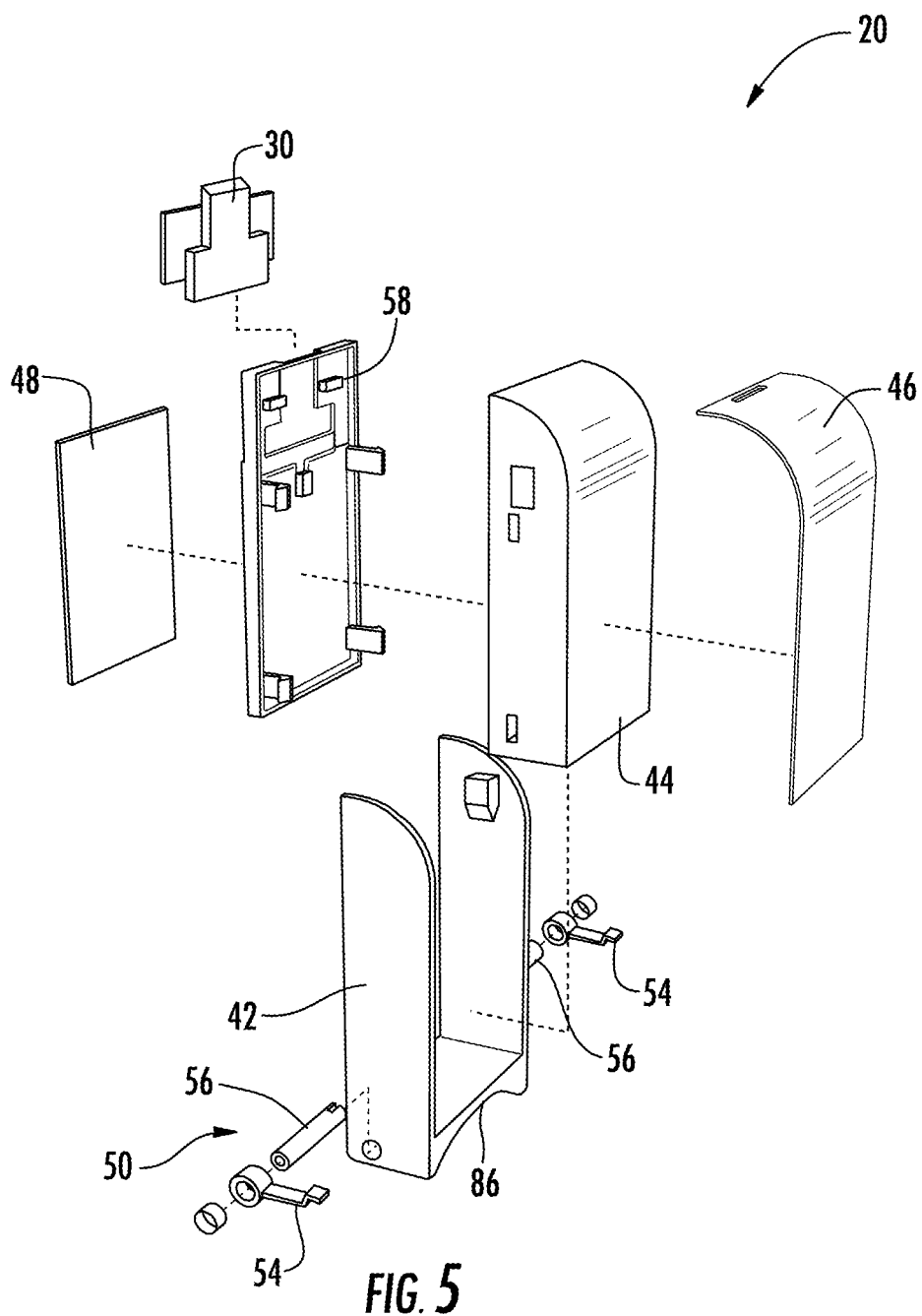
FIG. 5 is an exploded view of the module of FIGS. 3A and 3B, according to certain embodiments of the present invention.

Turning to the module 20 in more detail, as illustrated in FIGS. 4-5, the module 20 may include the laser projector 34, a sensor 36, a light lamp 38, and a printed circuit board (PCB) 40. In some examples, the laser projector 34 may be positioned at or near an upper portion of the module 20 (as discussed above). In accordance with at least one embodiment, the laser projector 34 may be attached to a back cover 58 of the module 20. As discussed above, the laser projector 34 may be configured to project a representation of a keyboard (i.e., individual shapes distinguishable as keys or the like) onto the top surface 18. In other examples, the laser projector 34 may be configured to project other shapes (e.g., area designating a track pad, a writing surface, an interactive game surface, and the like) onto the top surface 18 or other flat surface.

The sensor 36 of the module 20 may be mounted on the back cover 58 of the module 20 and disposed above the light lamp 38. In accordance with at least one embodiment, the sensor 36 may be an optical sensor capable of detecting light of various wavelengths (e.g., infrared light). The light lamp 38 of the module 20 may be mounted on the back cover 58 and disposed below the sensor 36. The light lamp 38 may be configured to project light, such as infrared light. In accordance with at least one embodiment, the light lamp 38 may be arranged to project light onto the top surface 18 at slight angle when the module 20 is in the extended position (i.e., active, upright, or open). The PCB 40 of the module 20 may be configured to interact with the other components of the module 20 discussed above. In some examples, the PCB 40 may be configured to control the light lamp 38, the laser projector 34, the sensor 36, and/or other components of the module 20 not herein explicitly described.

In accordance with at least one embodiment, the module 20 may be configured to detect interaction of a user with the top surface 18 of the integrated keyboard tray 12. For example, as illustrated in FIG. 1, the integrated keyboard tray 12 may be placed in an open position (i.e., the top surface 18 being disposed above the body 16 and not against a seat back 84 of a passenger seat 66). The user may put the integrated keyboard tray 12 into the open position by releasing a knob 70 of the passenger seat assembly 14 used to retain the integrated keyboard tray 12 in a closed position (i.e., a stowed position wherein the top surface 18 is nearer the seat back 84 of the passenger seat 66 than in the open position).

Continuing, the user may slide the locking tab 30 of the locking mechanism 24 of the module 20 to unlock the module 20 and allow it to rotate from the retracted position (FIG. 3A) to the extended position (FIG. 3B). When in the extended position, the module 20 may be configured to capture, identify, recognize, receive, process, or otherwise detect interaction of the user at the top surface 18. At least one type of the representative keyboard 28 may be utilized to provide a reference (i.e., inform the user where the keys are located) to the user while interacting with the top surface 18. In accordance with at least one embodiment, the laser projector 34 may be disposed above the sensor 36 and configured to project the representative keyboard 28 in the form of a laser projection on the top surface 18. The laser projection may include keys and markings distinguishing different keys. The light lamp 38 may be disposed below the sensor 36, near the bottom of the module 20, and be configured to emit an infrared light onto the top surface 18 at a slight angle.

In accordance with at least one embodiment, user interaction may be detected as infrared light from the light lamp 38 bounces (i.e., reflects) of off obstructions on the top surface 18 (e.g., human fingers, pointing devices, pointers, etc.) and enters (i.e., is captured by) the sensor 36. The PCB 40 may then process the information captured by the sensor 36 (i.e., the reflections of light) and calculate a position (i.e., location within the plane of the top surface 18 (e.g., x-y coordinates) and the type of movement (e.g., discrete movement, such as simulated keystrokes and/or continuous movement, such as mouse-like or tracking device movements that may be linear or non-linear). Based at least in part on this information, the PCB 40 may be configured process the input information captured by the sensor 36 and output corresponding keystroke information to others components of the integrated keyboard tray assembly 10 (e.g., a user device, an entertainment system, a network, etc.). In accordance with at least one embodiment, the PCB 40 or another component of the module 20 may be configured to transmit the output information to the other components according to wired or wireless techniques. For example, the module 20 may transmit the output information to OBE or IFE components (e.g., an onboard entertainment system 82 in the seat back 84), a personal electronic device (e.g., a PED 74 held in a case assembly 76), or the like. In some examples, the module 20 may form a data connection with the example devices above via WiFi, Bluetooth®, or similar wireless technology. In accordance with at least one embodiment, the module 20 may share a wired connection with one or more of the example devices, a power system, and/or a network.

In accordance with at least one embodiment, the module 20 may be disconnected from the integrated keyboard tray 12. For example, the module 20 may include a purely optical sensor (not shown). In this example, the module 20 may be mounted in any suitable location from which the purely optical sensor (e.g., a device, such as a video camera, capable of recognizing and processing movement) may view the top surface 18 in order to detect user interaction. When the module 20 includes a purely optical sensor, user interaction with the top surface 18 may be detected as the purely optical sensor (i.e., one or more lenses) recognizes the representative keyboard 28 and is configured to determine location of the user's fingers and movement in relation to keys on the representative keyboard 28.

In accordance with at least one embodiment, the module 20 may include capacitive sensors configured to detect user interaction with a capacitive touch screen. Thus, in some examples, the top surface 18 may include a capacitive touch screen (not shown) arranged as part of the integrated keyboard tray 12. In some examples, the module 20 and a lower portion of the capacitive touch screen may be disposed below the top surface 18 within the cavity 22. An upper portion of the capacitive touch screen may be more or less coplanar with the top surface 18. In this manner, the top surface 18 may retain its functional characteristics of supporting food trays and the like, while provided the enhanced interactive capabilities of user interaction with the capacitive touch screen. The capacitive touch screen may support multi-touch gestures, stylus input, and the like.

Turning next to the structural components of the module 20 as illustrated in FIG. 5. The module 20 may include a base 42, a main casing 44, a front sheet 46, a back sheet 48, the back cover 58, the locking tab 30, a curved portion 86, and hinge assembly 50. The base 42, the main casing 44, the front sheet 46, the back sheet 48, the back cover 58, the locking tab 30, the curved portion 86, and hinge assembly 50 may be formed of materials including but not limited to plastics, metals, carbon fibers, composite materials, or other suitable materials. The base 42 may be configured to retain the hinge assembly 50 and receive the main casing 44. In accordance with at least one embodiment, the main casing 44 may be snapped or otherwise secured into the base 42. In accordance with at least one embodiment, the two components may be releasably secured to each other.

The hinge assembly 50 may include springs (not shown), axis system 54, and barrels 56. The springs may be configured to provided tension on the axis system 54 and the barrels 56. In this manner, the springs may assist the module 20 as it moves from the retracted (inactive) position to the extended (active) position. The axis system 54 may include a conical portion and a flattened elongated portion. The conical portion of the axis system 54 may engage with the springs and the barrels 56 to retain the axis system 54 along the barrels 56. The elongated portion may be configured to engage with the body 16 of the integrated keyboard tray 12 to securely retain the module 20 in either of the positions (i.e., extended or retracted). The module 20 may be retained in the recessed portion 60 of the body 16 when a module securement device 52 engages with the body 16 (see FIG. 7).

The barrels 56 may be configured to the receive the springs and the conical portion of the axis system 54. In accordance with at least one embodiment, the barrels 56 may act as pivot points to create the pivotal coupling between the module 20 and the body 16. In some examples, the barrels 56 be hollow. In this manner, wire may be run from the module 20 to provide a power connection and/or a data connection.

Figure 6:
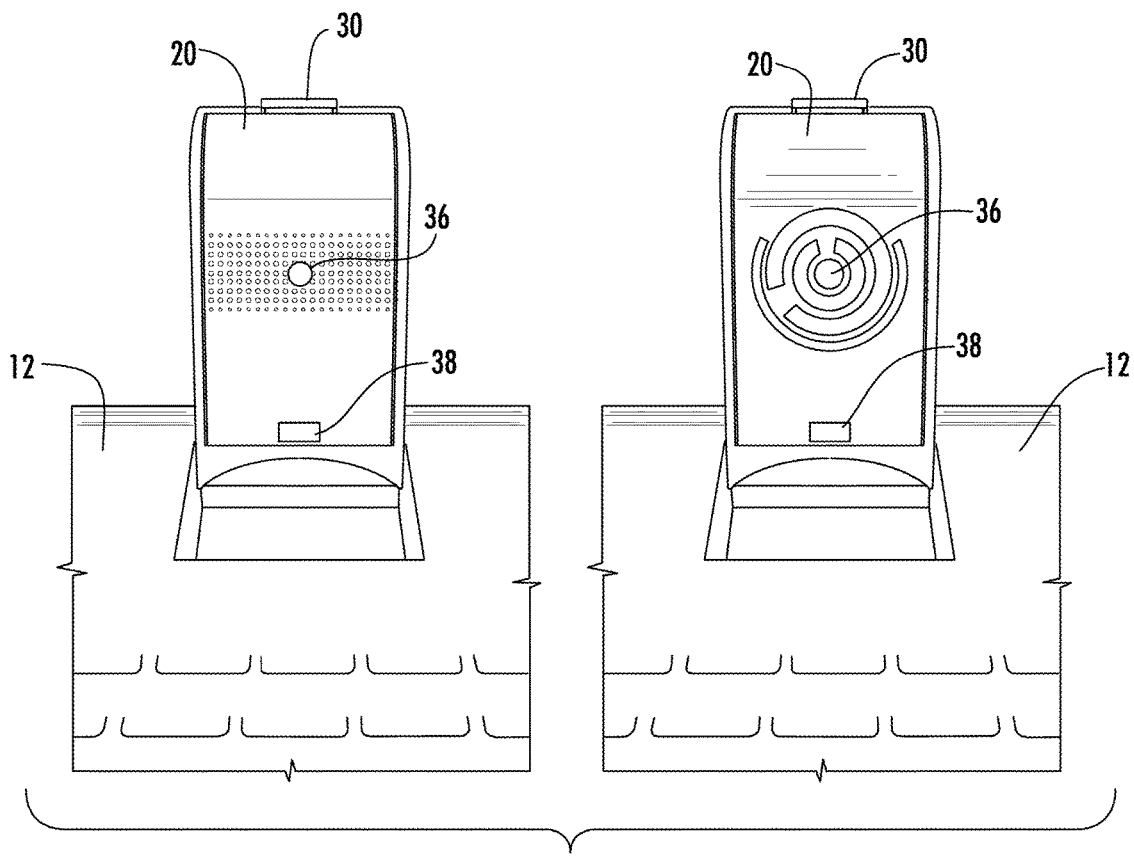
FIG. 6 is a frontal view of a pair of modules of FIGS. 3A and 3B in extended positions, according to certain embodiments of the present invention.
Figure 7:
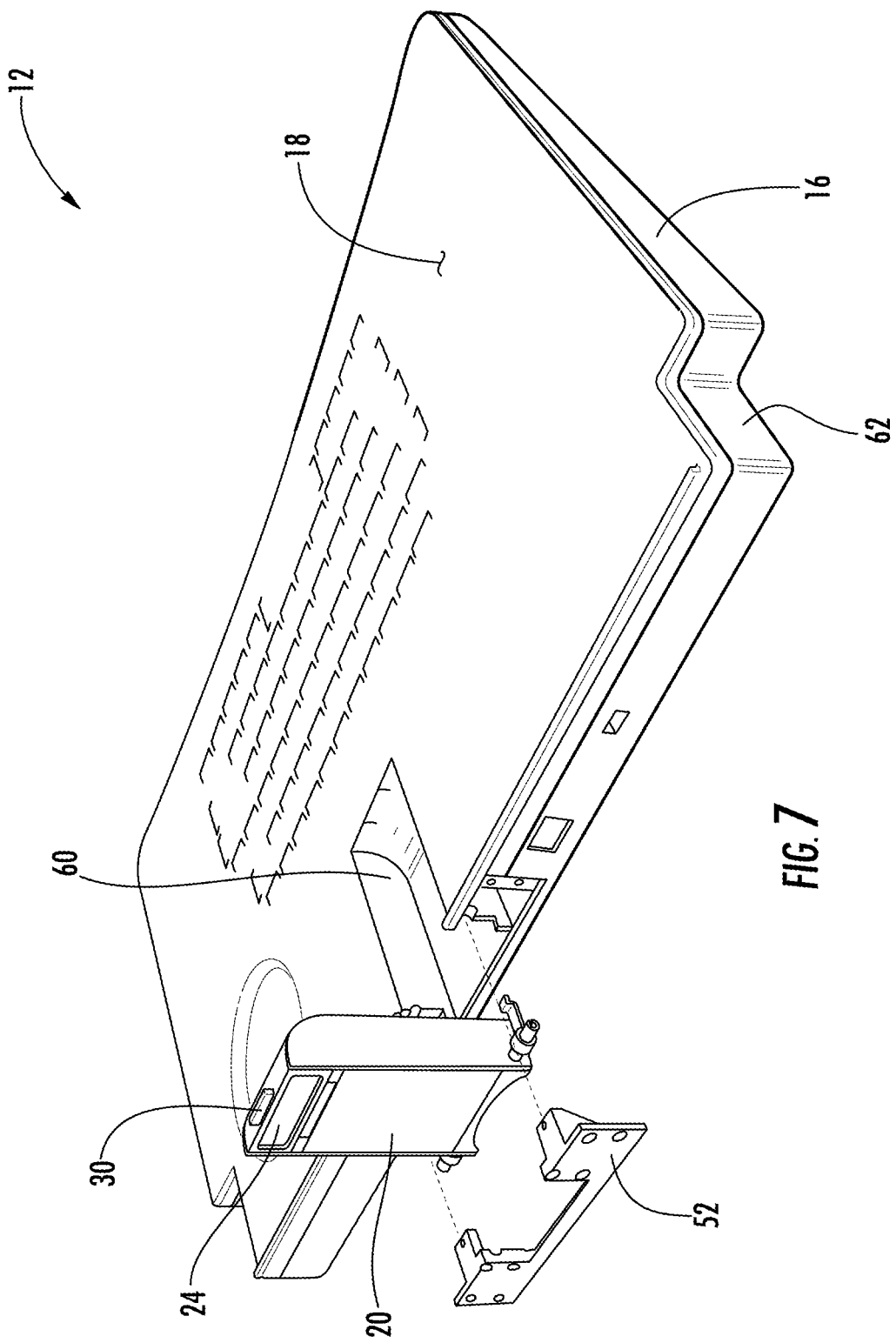
FIG. 7 is a perspective view of the integrated keyboard tray of FIG. 1 with a partial exploded view of the module of FIGS. 3A and 3B in the extended position, according to certain embodiments of the present invention.

The back cover 58 of the module 20 may be configured to retain the locking mechanism 24 and locking tab 30. Additionally, in accordance with at least one embodiment, the back cover 58 may be configured to accept and retain at least the sensor 36, the PCB 40, the light lamp 38, and the laser projector 34. In some examples, the back sheet 48 may provide protection to the back cover 58. In some examples, the front sheet 46 may provide protection to the main casing 44. In accordance with at least one embodiment, at least the front sheet 46 may consist of a paintable material, a material capable of etching, a material capable of chemical adhesion, or the like. In some examples, the front sheet 46 may be printed or etched to include ornamental decorations that may enhance the attractiveness of the module 20. In some examples, the decorations may be adhered to the front sheet 46 via chemical adhesion (e.g., stickers). In this manner, as illustrated in FIG. 6, the front sheet 46 of the module 20 may be utilized for logos and/or other decorations to enhance the user's perception of the module 20. In some examples, the decorations on the front sheet 46 may serve functional purposes. For example, a decoration may be placed on the front sheet 46 that indicates when the module 20 is in the different positions. In other examples, the sticker may provide instructions to the user as to proper use of the module 20 and the integrated keyboard tray 12.

Figure 8:
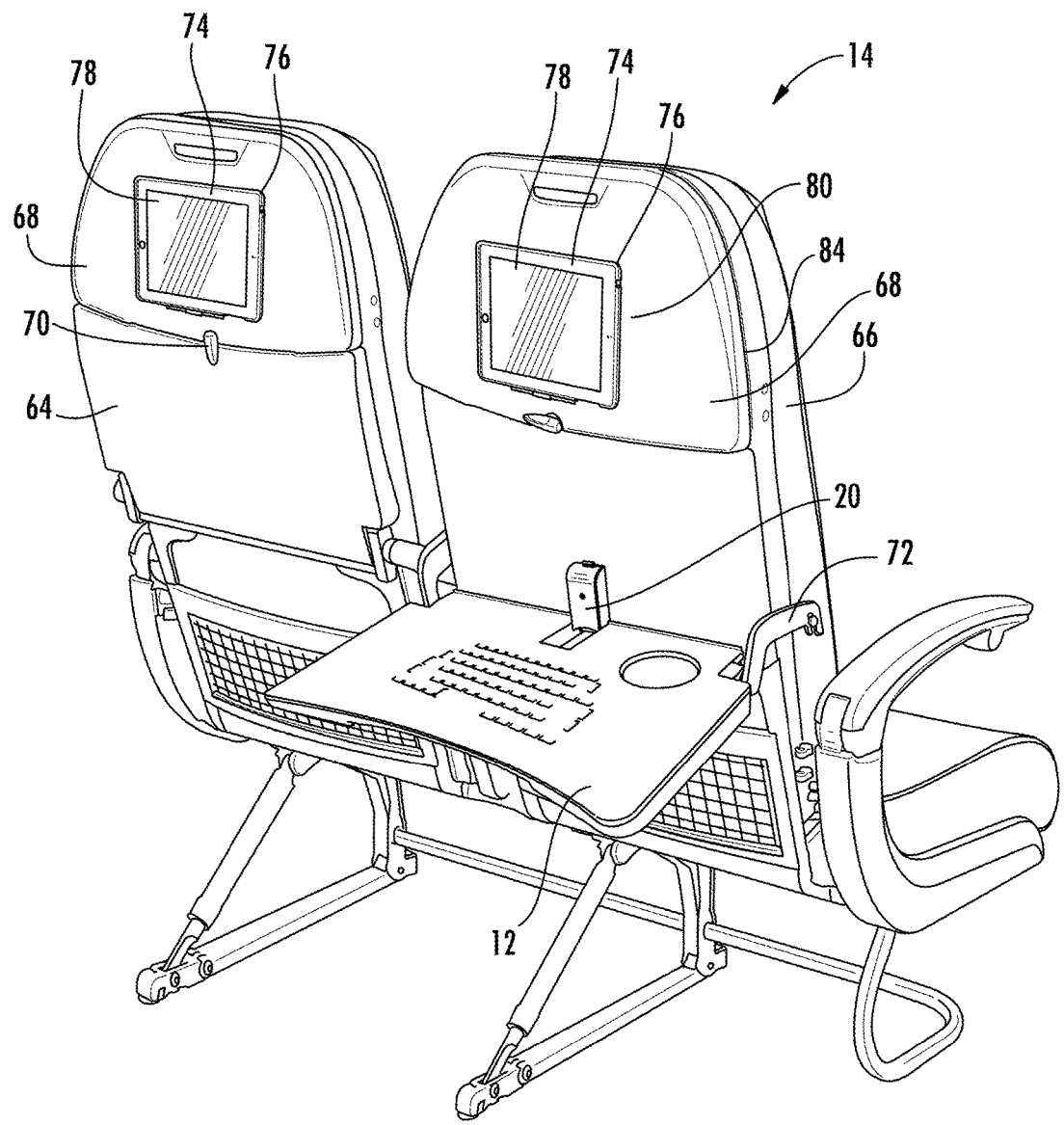
FIG. 8 is a perspective view the integrated keyboard tray assembly of FIG. 1 with a pair of personal electronic device assemblies, according to certain embodiments of the present invention.
Figure 9:
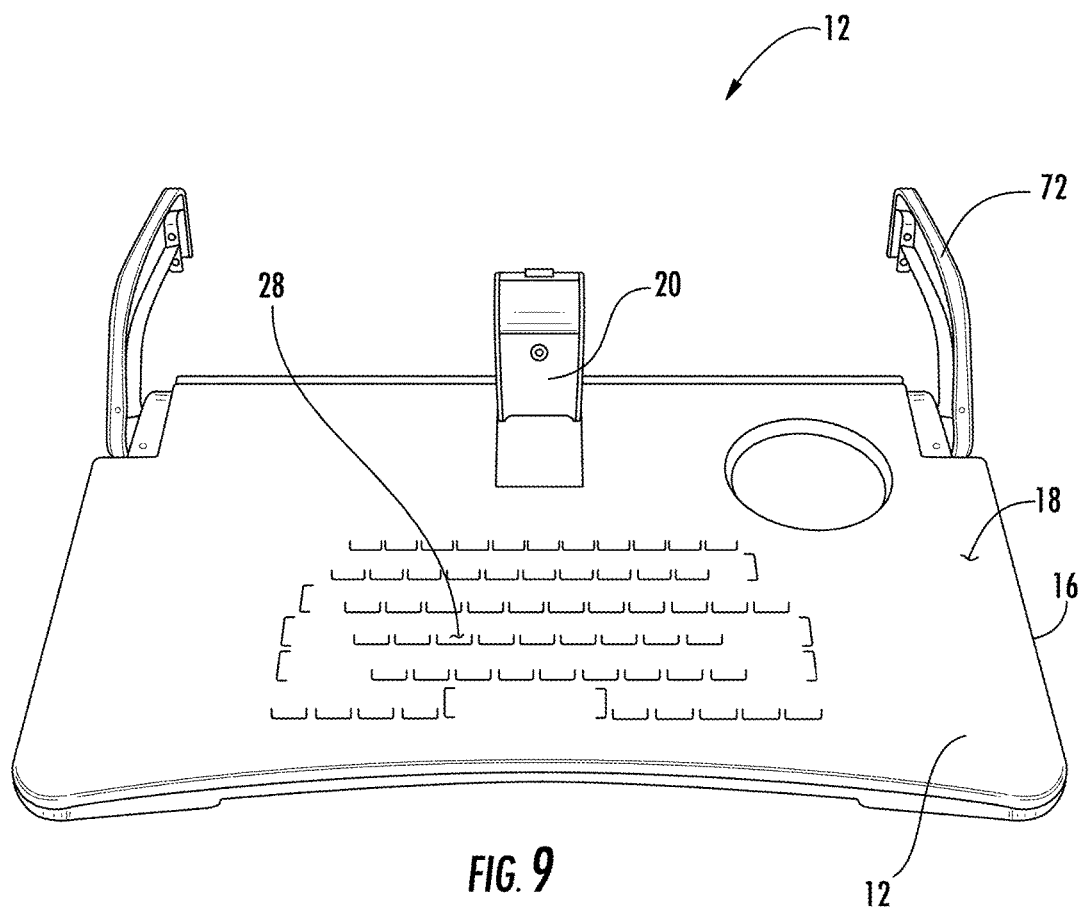
FIG. 9 is a frontal view of the integrated keyboard tray of FIG. 1 with a pair of hinges, according to certain embodiments of the present invention.

In accordance with at least one embodiment, as illustrated in FIGS. 8-9, the passenger seat assembly 14 may be provided. The passenger seat assembly 14, as more fully described in related International Patent Application Serial Number PCT/US2013/069611 identified above, may include a typical tray table 64, an integrated keyboard tray 12, the passenger seat 66, a pair of tray table hinges 72, the PED 74, a case assembly 76, a screen portion 78 of the PED 74, and a mounting assembly 80 (behind a shroud 68). In some examples, the mounting assembly 80 (not shown) may be securely fastened to the seat back 84 of the passenger seat 66. The mounting assembly 80 may be configured to releasably receive the case assembly 76, including the PED 74. The integrated keyboard tray 12 may be rotationally coupled to the seat back 84 via the tray table hinges 72. The tray table hinges 72 may be rotationally coupled to the integrated keyboard tray 12 at tray hinge attachment areas 62. The tray table hinges 72 may be configured to allow the integrated keyboard tray 12 to rotate between at least the open position and the stowed position.

In accordance with at least one embodiment, the module 20 may detect user interaction with the top surface 18 according to the techniques described herein. This detected interaction may be transmitted to the PED 74 in the form of inputs to the PED 74 and displayed on the screen portion 78. Thus, in some examples, the user may be able to interact (e.g., compose documents, input text and/or numbers, draw, navigate through webpages, control media players, click on interactive material, etc.) with the PED 74 while seated in a second passenger seat situated behind the passenger seat 66.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An integrated keyboard tray assembly comprising:
a tray table comprising a top surface of substantially planar construction and a body, wherein the top surface is disposed above the body when the tray table is in an open position;
a passenger seat, wherein a rear portion of the passenger seat shares a pivotal connection with at least the body of the tray table; and
a module comprising a sensor, the module pivotably coupled to the tray table adjacent to a perimeter edge of the tray table, wherein the module is configured to pivot between; a stowed position in which the sensor is inoperable to detect a user interaction at the top surface when the tray table is in the open position an extended position in which the sensor is operable to detect the user interaction at the top surface when the tray table is in the open position.

2. The integrated keyboard tray assembly of claim 1, wherein the sensor is an optical sensor and the user interaction at the top surface of the tray table comprises at least one of a discrete input or a continuous input.

3. The integrated keyboard tray assembly of claim 2, wherein the discrete input comprises one or more keyboard inputs on a simulated keyboard.

4. The integrated keyboard tray assembly of claim 3, wherein the simulated keyboard comprises at least one of a stenciled design on the top surface or a laser projection in the form of a keyboard on the top surface.

5. The integrated keyboard tray assembly of claim 2, wherein the continuous input comprises at least one linear movement or at least one non-linear movement of a tracking device in a two-dimensional plane.

6. The integrated keyboard tray assembly of claim 5, wherein the top surface comprises the two-dimensional plane and the tracking device comprises at least one of a human finger or a pointer.

7. The integrated keyboard tray assembly of claim 1, wherein the pivotal connection comprises a pair of hinges releasably attached to the body of the tray table and releasably attached to the rear portion of the passenger seat, and the tray table is disposed between the rear portion of the passenger seat and a front portion of a second passenger seat.

8. The integrated keyboard tray assembly of claim 1, wherein the module further comprises a light source, the light source configured to emit invisible light, and wherein detecting the user interaction at the top surface comprises processing a portion of the invisible light sensed by the sensor.

9. The integrated keyboard tray assembly of claim 8, wherein the module further comprises a laser projector, wherein the laser projector is configured to project a pattern on at least the top surface of the tray table.

10. A table assembly comprising:
a tray table comprising a body and a planar surface, wherein the planar surface is disposed adjacent the body; and
a module comprising a senor, the module pivotably coupled to the body of the tray table at a perimeter edge of the body, wherein the module is configured to pivot between; a stowed position in which the sensor is inoperable to detect an input at the planar surface and an extended position in which the sensor is operable to detect the input at the planar surface.

11. The table assembly of claim 10, wherein the input comprises an input of a user interacting with the planar surface and the module is configured to process the input of the user and transmit the processed input to an electronic device associated with the table assembly.

12. The table assembly of claim 11, wherein the electronic device is a tablet computer, a cell phone, a smart phone, a handheld video game system, a personal digital assistant, a palmtop computer, a DVD player, a data or audio-video media player, a monitor, an e-reader device, or a multimedia enabled device.

13. The table assembly of claim 10, wherein:
a back surface of the module and the planar surface of the tray table are substantially coplanar when the module is in the stowed position; and
a front surface of the module is substantially perpendicular to the planar surface of the tray table when the module is in the extended position.

14. The table assembly of claim 10, wherein the module further comprises a light source, the light source configured to project light onto the planar surface, wherein detecting the input at the planar surface comprises projecting, by the light source, light onto the planar surface and detecting light by the sensor.

15. The table assembly of claim 10, wherein detecting the input at the planar surface is performed when the module is pivoted to the extended position, at least a portion of the module is above the planar surface when the module is in the extended position.

16. The table assembly of claim 10, wherein the planar surface comprises a representative keyboard and the input at the planar surface comprises an input of a user interacting with the representative keyboard.

17. The table assembly of claim 16, wherein the representative keyboard is a stenciled keyboard, a projected laser keyboard, or a printed keyboard comprising photo-luminescent material disposed between the planar surface and the body of the tray table.

18. A passenger seat assembly comprising:
a passenger seat including a seat back; and
an integrated keyboard tray assembly comprising:
   a tray table adjustable from at least a stowed position to at least an open position, wherein a top surface of the tray table is nearer the seat back of the passenger seat when in the stowed position; and
   a module pivotally coupled to the tray table and configured to at least detect an interaction at the top surface of the tray table, wherein the top surface comprises a representative keyboard and at least part of the interaction is with the representative keyboard and detectable by the module.

19. The passenger seat assembly of claim 18, further comprising a case assembly comprising a case configured to receive a personal electronic device, wherein the case assembly is configured to releasably mount in a mounting assembly of the seat back, and the module is configured to transmit the detected interaction at the top surface to the personal electronic device.

20. The passenger seat assembly of claim 18, wherein:
the module is pivotably coupled to the tray table via a hinge assembly; and
the hinge assembly is configured to enable the module to pivot between a stowed position and an extended position, the module configured to detect the interaction at the top surface when in the extended position.

* * * * *